Patented Aug. 28, 1951

2,565,942

UNITED STATES PATENT OFFICE 2,565,942

PRESERVATION OF FOODSTUFFS

Georges Barsky, London, England, and Eugene Rivoche, Washington, D. C.; said Barsky assignor to said Rivoche No Drawing. Application February 25, 1948, Serial No. 10,913. In France October 11, 1941

Section 1, Public Law 690, August 8, 1946
Patent expires October 11, 1961

14 Claims. (Cl. 99—103)

This invention relates to the preservation of perishable foodstuffs such as fruits and vegetables and, more particularly, to a novel method of preparing such foodstuffs for preservation by any one of several known processes.

Among the known methods of preservation of foodstuffs which are widely utilized are: (1) Preservation by drying, the resultant product being in one of many different forms such as whole, sliced, powdered, or the like; (2) Preservation by pickling in brine, vinegar or like preserving liquids; (3) Preservation by immersion in a sugar solution having a sugar content sufficient to prevent the deterioration of said foodstuffs; (4) Preservation by the exclusion of air by enclosure in sealed cans or other like sealed containers, which method may be combined with any of the preceding methods; (5) Preservation by freezing, the freezing process being carried out in a manner which minimizes the disruption of the cellular structure of the material being frozen. Each of these methods of preservation may be favorably affected by the use of the process which is the subject matter of this invention, which process is particularly applicable to the preservation of foodstuffs having a natural moisture content of 70% or more.

It has been customary in the past to apply all the methods of preservation listed above to fresh foodstuffs either after merely cleaning, or after cleaning and partially cooking, or after cleaning and complete cooking. In each case the moisture content of the foodstuffs is substantially unchanged by such acts of preservation. For example, it has been found that potatoes, having in their natural state a moisture content of 78%, generally have a moisture content of between 77 and 79% after cleaning and cooking in the customary fashion.

Various difficulties have been found to arise in connection with such methods of preservation, and, as a result of extended research and experimentation, applicant has found that these difficulties are directly associated with the presence of a high proportion of moisture in the foodstuffs to be preserves. Some of the adverse results of this relatively high moisture content are: (1) Any application of heat tends to produce a physical breakdown of the structure of the foodstuffs; (2) The various necessary acts of manipulation during the preservation process also tend to produce such a physical breakdown; (3) The excess water in the material to be preserved tends to flow out of that material into the medium in which the material is immersed, carrying with it valuable nutriments, color factors and flavors; and (4) Any drying operation will obviously be retarded and the manipulation of the material to be dried may be rendered extremely difficult, as well as the production of the product in the desired final form.

Applicant has found that each of these difficulties may be substantially reduced by a process of preparation of such foodstuffs for preservation which involves a partial drying step before the foodstuffs are submitted to any of the above noted methods of preservation, and that such partial drying may be carried out advantageously even before the act of cooking the foodstuffs, when such cooking is a desirable part of the preserving process. This partial reduction of the moisture content of the foodstuffs produces the following general advantages: (1) Reducing the structural tension and yet producing a general toughening of the foodstuffs, thus facilitating the acts of necessary manipulation without producing a physical breakdown of the foodstuffs; (2) Reducing any tendency toward any undesired physical breakdown during the cooking operation itself; (3) Reversing the transference of natural moisture from the foodstuffs to the preservative liquid so that, instead, the liquid itself tends to be absorbed, with the result that the normal loss of nutriment, color factors and flavors is thereby reduced and that in this way the products can absorb and be saturated with solutions with desirable degrees of concentrations, which can contain, for example, anti-oxidents, vitamins, colorings, etc. and many other valuable products which will improve the quality of the final preserved products; (4) Facilitating the drying of the foodstuffs, particularly where cooking is a step in the preservation process.

The partial drying contemplated in this process should be carried out in such a way that the temperature of the foodstuffs does not exceed about 50° C. Care should be taken to avoid physical damage to the foodstuffs during this drying process but no special apparatus is required. Any suitable means may be utilized such as hot air stoves, steam ovens and the like. Generally speaking, any apparatus which will reduce the water content so that the initial weight of the foodstuffs is lowered by 15 to 40 percent is satisfactory, if this reduction can be performed within the above temperature limitations.

In connection with the method of preserving foodstuffs which itself consists of drying the desired material so that the moisture content is reduced to a point where fermentation of the product is prevented without requiring an airtight container, the utility of this invention is largely concerned with materials which not only are dried but are also cooked. Unfortunately the normal drying operation, already difficult and delicate with raw products, becomes almost impracticable with cooked products, since the cooking renders them so tender, doughy or breakable that they cannot be manipulated without deterioration. Such cooked products are inclined to stick together in relatively large masses and to cling to the wall of the cooking utensil and walls and mixers of the drying apparatus. This is of great significance in the preparation of dried cooked products in powder form, for instance, since it becomes quite difficult to reduce a material having these characteristics to a powdered form. Since this is perhaps the most desirable form of dried cooked products, it would be highly desirable to develop a method which would enable the cooking or drying and the subsequent rendering into a powdered form without difficulty.

In addition, the usual combination of cooking and drying causes a loss of cooking juices which contain a very great proportion of the richest constituents of the raw product. This loss is engendered by the separate cooking of the foodstuffs in water which is subsequently drained off. Of course, it would be possible to concentrate this water until a dried extract was obtained therefrom but such a process would be long and costly and would provoke chemical modifications of the substance thus concentrated. In addition, the powders obtained by such concentration of the cooking water often cannot be readily re-mixed in a homogeneous way with the product obtained from the drying of the foodstuffs themselves.

In carrying out the process which is the subject matter of this invention in connection with the drying of cooked foodstuffs, a partial drying of the raw foodstuffs is first performed, in the manner described above, so that the natural water content is greatly reduced, although generally not exceeding about 40% of the initial weight of the material. Although the reducing of the water content by about 40% of the initial weight of the material is generally sufficient, in some cases, for example, when treating products of very rich water content like most of the berries, green vegetables and some fruits the partial drying can be prolonged until a loss of approximately 60% of the initial weight of the material has occurred. The definite determination of how far the preliminary drying has to be preformed depends upon the kind of product and generally, the first partial drying should leave in the food stuff only the minimum quantity of moisture necessary for cooking it so that a perfectly cooked product can be obtained without adding supplementary water.

The degree of preliminary evaporations is easy to determine by simple experimentation of each product, varying with the initial moisture content and structure of the product.

After such drying has taken place there is still sufficient water in the material to allow it to be cooked without the use of additional water, if proper precautions are taken to avoid physical damage to the product by overheating and subsequent loss of too great a percentage of its natural moisture.

This cooking step may be greatly facilitated by charging the vessel in which the material is to be dried, preferably with alternate layers of the raw product to be partially dried and of the finished product which has been both dried and cooked. It also might be most desirable and feasible to charge the vessel with alternate layers of the material to be dried and of the same material which has been completely dried without cooking, or a dry product of a different class which is to be preserved together with the product which is to be so dried, and which may be utilized either in a raw or in a cooked state.

The partially dry product is thus submitted to a cooking or stewing operation in which the material is cooked without the addition of any moisture. This operation is performed advantageously, for example, in a hot saturated air stove or the like adapted for stewing products which have only that amount of moisture now remaining therein.

During this cooking process the dehydration should not go beyond a predetermined degree which is usually in the order of 60% of the total initial water content of the product. However, if it is desired to not reduce the moisture content significantly by the cooking process, it is an advantage to convey the heat necessary directly to the material by means of steam or hot saturated air so that any substantial changes in the content of the water in the material may be avoided. In addition the use of steam increases considerably the uniformity of the heating, which is difficult to achieve when the source of the heat is the walls of the oven alone. Of course, it might be possible to carry out the partial drying step in such a way that more of the moisture than is necessary is removed from the foodstuffs, and then allowing a certain amount of re-hydration to take place in the cooking process so that the finished product has the desired moisture content.

After the completion of the cooking step, the partially dried and cooked material may be easily removed from the cooking vessels because of the effectiveness of the layer arrangement. There is substantially no sticking to the walls and vessels and the material is of a consistency which makes it relatively easy to manipulate. The insulating effect of the layers of relatively dry material serves to keep the moisture from the more moist layers from being lost as juices and also provides a venting of the charge which allows the excess moisture in those latter layers to readily escape. Any further drying found to be necessary after the cooking may then be carried out and such a step may either follow, precede or occur simultaneously with a step designed to give the final product the desired form, such as a powdering step. Of course, there is some evaporation which naturally takes place during the cooling period after the material is removed from the cooking vessels and this alone may be sufficient to carry out the additional drying required.

This new method permits also the obtaining of cooked and dried products of an unknown, until now, quality and character by the following processes: The products are first submitted to a pre-drying operation as described above. They are then immersed in a solution saturated with highly voluble material as above mentioned such as anti-oxidants, vitamins, colorings and the like.

This allows the foodstuffs to obtain new nutritive qualities as well as new tastes, colors, flavors, etc. The quantity of moisture and nutrition elements absorbed in this way is easily controlled. After this immersion, a new dehydration preliminary to cooking can be effected so that cooking will be realized with the product having the desired moisture content as described above. If the materials desired to be added by immersion to the preliminary evaporated foodstuffs are of the kind which may be deteriorated by cooking, this immersion can be done not before the cooking but after the product has been cooked, and before the final drying. Products cooked under those conditions, or which are treated in this way will always have a high and easy degree of absorption. It is easy to realize innumerable advantages that may be obtained by these new methods.

Turning now to the application of the invention to the pickling of foodstuffs, it has been found that the partial drying of such materials before being introduced into the pickling medium is of distinct advantage. In the normal pickling process the material to be so treated either in a cooked or uncooked state has a relatively high percentage of natural moisture therein, as discussed above. Because of this natural water content it is necessary to utilitze a highly concentrated pickling medium so that the reduction of its concentration by the action of the natural moisture in the pickled material does not weaken the resulting solution too greatly. In addition, when there is a greater concentration of water in the material to be pickled than in the pickling medium, the water within the foodstuffs has a tendency to leave that material and dilute the pickling medium, and in doing so it tends to carry with it valuable nutriments, color factors and flavors. Since the pickled material, rather than the pickling medium, is that which is normally consumed by the user, it is obvious that it would be of great value to find a means of maintaining these elements in the material itself which is being preserved.

If the material to be pickled, on the other hand, is subjected to a partial drying before being introduced into the pickling medium, the reduced water content of the foodstuffs permits the use of a less concentrated pickling medium since the type of dilution mentioned above does not then occur. Also, the tendency for the valuable constituents to leave the material to be preserved is not present since the exchange of moisture is in this case in the opposite direction, namely, the material being pickled has a tendency to absorb the water in the pickling liquids.

Materials which have been both partially dried and cooked in the manner described above in connection with the drying of foodstuffs are also particularly adapted to being pickled, since they too will react in the same fashion as material which has only been partially dried.

By this means it thus becomes possible to reduce substantially the required proportion of pickling material by weight, to the weight of the products treated. As the product partially dried and cooked, according to the method of the present invention is considerably lighter and less bulky than the corresponding amount of cooked product or a corresponding amount of the same product cooked in the normal fashion, the above mentioned proportion of preserving substance is much smaller than in the case of all known cooking or preservation processes.

The method of first partially drying the products, before pickling, also allows the obtaining of the same advantages as mentioned before, due to the new absorption capacity of the products after the partial dehydration. Any colors, flavors, tastes, vitamins, mineral salts, etc. which will be in the preservative liquids, will be absorbed by the products, and in this way, a considerably better product will be obtained with increased flavor and taste. For example, the preservative liquid may contain an extract of the same type of product as that being preserved, or mixed flavors may be obtained in the final product by including in the preserving liquid an extract of other foodstuffs, or other flavors which are thought to be desirable to mix with the natural flavor of the foodstuff being preserved.

In addition, it is possible to pickle products which have been subjected to the process of complete drying for preservation, as described above. The reduction of moisture has been even more complete in such cases and the advantages discussed above in connection with the partial drying of materials to be pickled are even more pronounced in this case. This invention may also be used to advantage in the preservation of products by mixing such products with a solid preservative such as salt or the like rather than by the previously discussed method of immersing in a pickling medium such as brine. For example, when a product is first partially dried before being salted, the partial drying has a preservative effect itself which reduces the amount of the salt needed to obtain complete preservation. In other words, removal of a portion of the natural water content makes it possible to utilize a smaller amount of solid preserving medium.

With reference to the preservation of foodstuffs by the use of sugar syrup as a preserving medium, or in the preparation of jams and the like, this invention can be of a particular value. In the preparation of many of the products preserved in this way it is necessary to reduce the moisture content of the product to a point where the percentage of sugar is sufficient for proper preservation. In other words, after the foodstuffs and the sugar have been mixed together it is necessary to eliminate a good portion of the water in the mixture, and because such reduction is normally accomplished by prolonged boiling, many of the desirable components of the mixture are boiled off or destroyed, such as color factors, flavors, aromatic oils and the like. However, if in the first step of the process a portion of the natural moisture is removed, this long continued boiling process is not necessary. In fact, if the moisture content is reduced sufficiently before any sugar is added, it is sometimes possible to merely add boiling syrup to the product so partially dried and the syrup will produce the necessary sterilization and cooking to produce proper preservation. In addition, the elimination of the long continued boiling step permits the preservation of the foodstuffs in its natural form, such as whole fruit or the like, instead of causing it to disintegrate into a pulpy mass. Preservation of this form is highly desirable and is normally found today only in the more expensive products, since great care and special steps must be taken to achieve this result. Here again there is no distinction between the partially dried raw product and the partially dried and cooked product, since the shape and form of the individual units of cooked product are maintained in such a way that they can be preserved whole, and the product has not lost any substantial amount of its valuable components which under normal processes are dissipated or destroyed.

The successful preservation of foodstuffs in a sugar syrup, depending on the concentration of the syrup, is sometimes also dependent upon the product being canned, but for convenience, applicant has treated the use of sugar syrups separately from the canning process, since canning may also be utilized with drying and pickling, although it is not normally a necessary adjunct thereto. No specific mention has been made heretofore of preservation by saturation with sugar, the product being in a substantially solid state such as candied fruits and the like. This process is obviously very closely related to the process of preserving in sugar syrups and the advantages brought about in the latter method by the use of the invention are also created by its use in the production of candied products.

The same advantage of application of processes described above, with reference to cooking and pickling, in the sense of obtaining new qualities of products are applicable in this treatment.

In connection with the application of this invention to the freezing method of preservation of foodstuffs, a partial drying of the products to be frozen has been found to be extremely desirable. Even in the most advanced techniques of freezing food products wherein the material is frozen very rapidly so that the breakdown of cellular structure and the like is reduced to a minimum, some such destruction does occur. This is caused by the large percentage of natural moisture in the foodstuffs which even in quick freezing expands sufficiently to cause some rupture of the internal structure of the material. When this structural change has occurred, and when the foodstuffs are subsequently unfrozen, there is a loss of natural moisture which seeps from the thawed product. This moisture carries with it valuable components in much the same way as similar components are lost into the picking liquid as described above.

If the foodstuffs to be frozen are first subjected to a partial drying so that a significant portion of the natural moisture is removed, this destruction of the cellular structure by the water expanding as it changes into the solid form is prevented almost entirely. The fact that some of the natural moisture has been removed is of no particular significance since, if additional moisture is then desired after the product has been unfrozen, it can be easily added by submerging the product in water for a short period.

It also should be evident that both the step of partially drying the products to be preserved, and the subsequent step of immersing said products in special solutions, as described above, to give the products unusual characteristics which they would not otherwise have can be utilized when said products are to be frozen as the final step in the preservation process. In order to retain the aforementioned advantage of a reduced natural water content in the freezing step, the quantity of moisture reabsorbed while said substances are immersed in the special solutions may be regulated so that the water content is not again raised to the original amount. In addition, if the foodstuffs so immersed before freezing have absorbed more than the desired amount of moisture, it is also possible to partially dry them a second time before final freezing. On the other hand, it may be preferable to remove considerably more moisture in the initial drying than is necessary to obtain the advantage described in the freezing process, so that when the products are immersed in the desired solution prior to freezing, a desired amount of material may be reabsorbed without raising the water content beyond the point which will give the desired results when the products are frozen.

As mentioned above, this invention is also related to the improvement of the preservation of foodstuffs by canning. For instance, it might be desirable for some purposes, such as for military or naval uses, to can the dried foods prepared under this process so that they are in sealed containers and positively protected from being exposed to moisture. In addition, products which are preserved by their being disposed in a sugar syrup and in an airtight container will be of better quality, taste and shape than is common today. The same advantages can be stated for products which are enclosed in airtight containers after having been immersed in a pickling medium.

The methods previously described in detail with reference to the cooking, pickling, and immersion in special solutions, after the foodstuff has preliminarily been treated to remove a portion of the initial water content therefrom are highly recommended and easily applied where the final preserving of the foodstuff is to be obtained by freezing it. Thus, after the foodstuff has been preliminarily dried and cooked, pickled or caused to absorb any desired edible substance, it may be subjected to any well-known freezing method for its final preservation.

As can be readily seen from the above discussion, the number of possible applications of this method of preparation of perishable foodstuffs to the preservation of such materials by known methods is very large. Applicant does not claim to have covered every possible specific application of the invention to the various forms of preservation listed above but believes that enough examples have been given to insure an understanding of the significance of the partial drying step before the cooking step, as well as before the step of immersing in special edible solutions, and the subsequent preservation of the foodstuffs. In any event, applicant has discovered that the preparation of foodstuffs for these various processes by adjustment of the natural water content is of primary importance in connection with the ease with which the subsequent preservation process may be carried out, the cost of such a process, and the quality and general desirability of the products.

We claim:

1. In a method of producing a dehydrated starchy product, the steps of removing natural moisture from the starchy product until the initial weight thereof is lowered by at least 15%, and thereafter cooking the partially dehydrated starchy product.

2. The method of producing a preserved foodstuff which comprises eliminating moisture from the foodstuff until the initial weight thereof is lowered by about at least 15% but not to such an extent that the foodstuff contains insufficient moisture to permit its subsequent cooking without the addition of water thereto, said elimination of moisture being conducted at a temperature below that which will produce appreciable cooking of the foodstuff, thereafter cooking the partially dehydrated foodstuff without substantial addition of moisture thereto, and subjecting the cooked foodstuff to a preserving treatment.

3. The method of producing a preserved foodstuff as defined in claim 2 in which moisture is eliminated from the foodstuff until the initial weight thereof is lowered by about 15% to 60%.

4. The method of producing a preserved foodstuff as defined in claim 2 in which the preserving of the foodstuff is obtained by causing it to absorb an edible preserving substance.

5. The method of producing a preserved foodstuff as defined in claim 2 in which the preserving of the foodstuff is obtained by freezing it.

6. The method of producing a preserved foodstuff as defined in claim 2 in which the foodstuff is treated with an anti-oxidant before the completion of the cooking operation.

7. The method of preserving foodstuffs which comprises eliminating natural moisture from the foodstuff until the initial weight thereof has been lowered by about at least 15% but not to such an extent that the foodstuff contains insufficient moisture to permit its subsequent cooking without the addition of water thereto, said elimination of moisture being conducted while the foodstuff is maintained at a temperature below that which will produce appreciable cooking thereof, thereafter cooking the foodstuff without substantial addition of moisture thereto, and removing sufficient water from the cooked foodstuff to preserve it.

8. The method of preserving foodstuffs as defined in claim 7 in which the temperature of the foodstuff is maintained below about 50° C. during the preliminary elimination of moisture therefrom.

9. The method of preserving foodstuffs as defined in claim 7 in which the initial weight of the foodstuff is not lowered by more than about 60%.

10. The method of preserving foodstuffs as defined in claim 7 in which the cooking of the preliminarily-dehydrated foodstuff takes place while it is mixed with previously-cooked and dried foodstuff.

11. The method of preserving foodstuffs as defined in claim 7 in which the foodstuff, after removal of sufficient water therefrom, is reduced to powder form.

12. The method of preserving foodstuffs as defined in claim 7 in which the foodstuff, after the cooking thereof and before the final removal of moisture therefrom, is caused to absorb an edible solution of a substance to be deposited in the foodstuff.

13. The method of preserving foodstuffs as defined in claim 7 in which the foodstuff, after the preliminary elimination of water therefrom and before the cooking thereof, is caused to absorb a solution of an edible substance to be deposited in the foodstuff.

14. The method of preserving foodstuffs which comprises eliminating moisture from the foodstuff until the initial weight thereof has been lowered by about at least 15% while maintaining the foodstuff at a temperature below that which will produce appreciable cooking thereof, causing the partially dehydrated foodstuff to absorb a solution of an edible substance to be deposited therein, and thereafter subjecting the foodstuff to a preserving treatment.

GEORGES BARSKY.
EUGENE RIVOCHE.

REFERENCES CITED

The following references are of record in the file of this patent:

UNITED STATES PATENTS

| Number | Name | Date |
|---|---|---|
| 830,407 | Bowers | Sept. 4, 1906 |
| 1,138,887 | Plunkett | May 11, 1915 |
| 2,137,890 | Hopkins | Nov. 22, 1938 |
| 2,191,695 | Holzman | Feb. 27, 1940 |
| 2,192,041 | Headland | Feb. 27, 1940 |
| 2,419,877 | Birdseye | Apr. 29, 1947 |
| 2,444,579 | Newson | July 6, 1948 |
| 2,477,605 | Howard et al. | Aug. 2, 1949 |

FOREIGN PATENTS

| Number | Country | Date |
|---|---|---|
| 26,890/30 | Australia | May 24, 1930 |